US000002009B1

(19) United States

(12) Statutory Invention Registration

Martin et al.

(10) Reg. No.: US H2009 H

(43) Published: Jan. 1, 2002

(54) HEIGHT ADJUSTMENT DEVICE FOR LOAD SUPPORT

(75) Inventors: Michael J. Martin, Herndon, VA (US); David C. Warwick, Frederick; Matthew A. Craun, Gaithersburg, both of MD (US)

(73) Assignee: The United States of America as represented by the Secretary of the Navy, Washington, DC (US)

(21) Appl. No.: 09/131,228

(22) Filed: Aug. 7, 1998

(51) Int. Cl.[7] ..... F16M 1/00

(52) U.S. Cl. ..... 248/677; 248/188.2

(58) Field of Search ..... 248/678, 188.2, 248/677, 649, 178.1

(56) References Cited

U.S. PATENT DOCUMENTS 1,987,726 A * 1/1935 Wilkerson et al. ..... 248/657
3,306,562 A * 2/1967 Bellefleur ..... 248/188.2
3,349,662 A * 10/1967 Williams ..... 411/46
4,114,845 A * 9/1978 Weisenberger ..... 248/188.2 X
4,436,268 A * 3/1984 Schriever ..... 248/188.2 X
4,589,351 A 5/1986 Love
4,858,865 A * 8/1989 Schrepfer ..... 248/188.2
5,090,924 A 2/1992 Pfaller et al.
5,157,814 A 10/1992 Mann
5,584,464 A * 12/1996 Whittaker ..... 248/678

* cited by examiner

*Primary Examiner*—Harold J. Tudor

(74) *Attorney, Agent, or Firm*—John Forrest

(57) ABSTRACT

A leveled load is carried by a support on one of the exterior surfaces of a pair of outer wedges maintained in parallel spaced relation to each other by an intermediate activating wedge to which selective horizontal displacement is imparted relative to the outer wedges for vertical adjustment. Such selective displacement is imparted by rotation of a screw bolt threaded through a centering pin held in non-rotatable relation to the intermediate wedge in vertical alignment with the load support.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEIGHT ADJUSTMENT DEVICE FOR LOAD SUPPORT

The present invention relates in general to vertical height adjustment of leveled loads on supports.

BACKGROUND OF THE INVENTION

It is already well known in the art that adjustments by wedge displacement may be effected in response to selective rotation of a screw bolt, as disclosed for example in U.S. Pat. No. 5,157,814 to Mann in connection with clamps. Such adjustment involves imparting rotation to the screw bolt at its head end for axial displacement through a reaction element, in order to transfer such displacement to an actuating wedge along the screw axis to thereby cause displacement of an adjustment wedge in a lateral direction relative to the screw axis by its sliding contact with the actuating wedge. However, use of the foregoing type of wedge adjustment arrangement has not been suggested for nor applied to a load support environment such as shipboard machinery requiring vertical height adjustment without disturbance of its load leveled condition.

SUMMARY OF THE INVENTION

In accordance with the present invention, a screw adjusted wedge arrangement includes a pair of outer wedges separated by and in sliding engagement with an intermediate actuating wedge having a slot formation therein through which a centering pin extends vertically between the outer wedges. The outer wedges prevent rotation of the centering pin and hold it axially fixed relative to the axis of a screw bolt so that selective rotation of the screw bolt, threadedly extending through the centering pin within the slot formation, causes it to be horizontally displaced along the screw axis relative to the outer wedges. Such horizontal displacement of the screw bolt is transferred to the actuating wedge in sliding contact with the confronting surfaces of the outer wedges so as to cause vertical displacement of the outer wedges relative to each other laterally of the screw axis. One of such outer wedges mounts a load support thereon in vertical alignment with the centering pin. Vertical displacement of an outer wedge by selective rotation of the screw bolt is thereby transferred to the load support for in-situ height adjustment of heavy leveled loads on such support without level disturbance.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
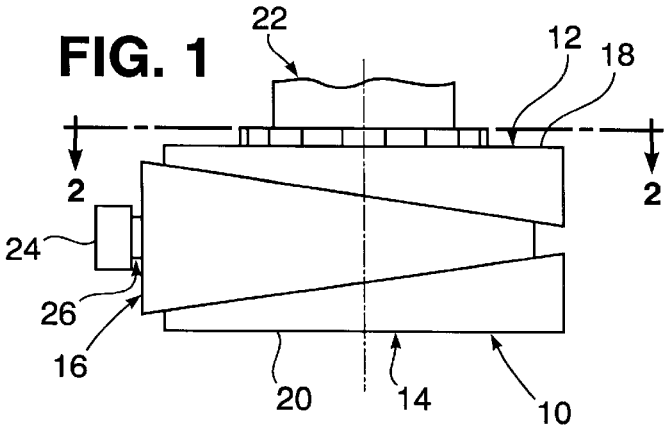
FIG. 1 is a side elevation view of a load height adjustment arrangement in accordance with one embodiment of the invention.
Figure 2:
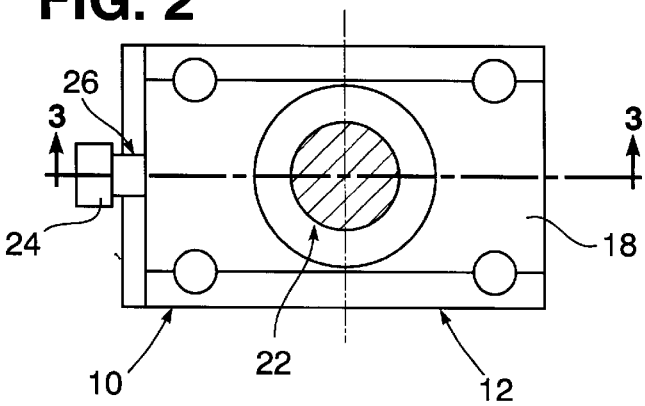
FIG. 2 is a top plan section view taken substantially through a plane indicated by section line 2—2 in FIG. 1.

Referring now to the drawing in detail, FIGS. 1 and 2 illustrate a load height adjustment arrangement, generally referred to by reference numeral 10, having a vertically stacked wedge assembly consisting of upper and lower wedges 12 and 14 and an intermediate actuating wedge 16. Such three wedges 12, 14 and 16 are shaped so that upper and lower exterior surfaces 18 and on the outer wedges 12 and 14 are always parallel in order to avoid disturbances of the leveled condition of a load, such as shipboard machinery, provided by a standard type of load support 22 fixed to the upper exterior surface 18 of the wedge 12. Height adjustment of such load on the support 22 is effected in-situ by selective manual rotation of the head end 24 of a screw bolt 26 projecting from one side of the intermediate actuating wedge 16 as shown in FIGS. 1 and 2.

Figure 3:
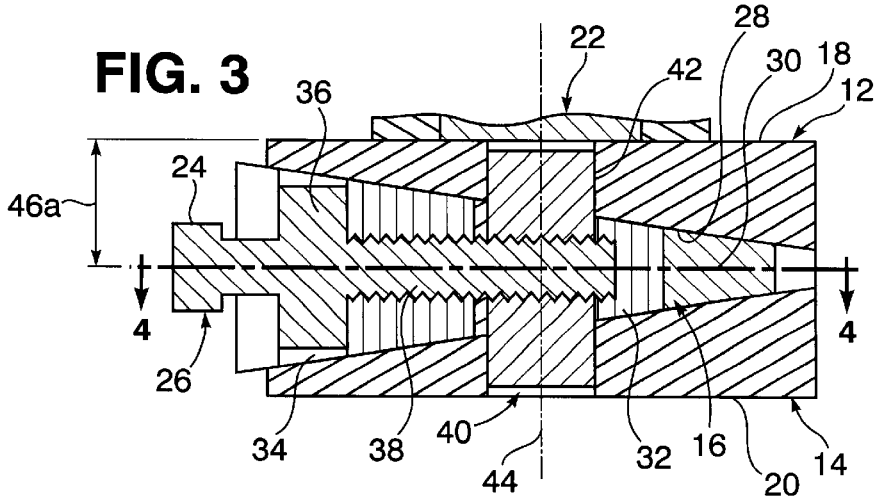
FIG. 3 is a side section view taken substantially through a plane indicated by section line 3—3 in FIG.2.
Figure 4:
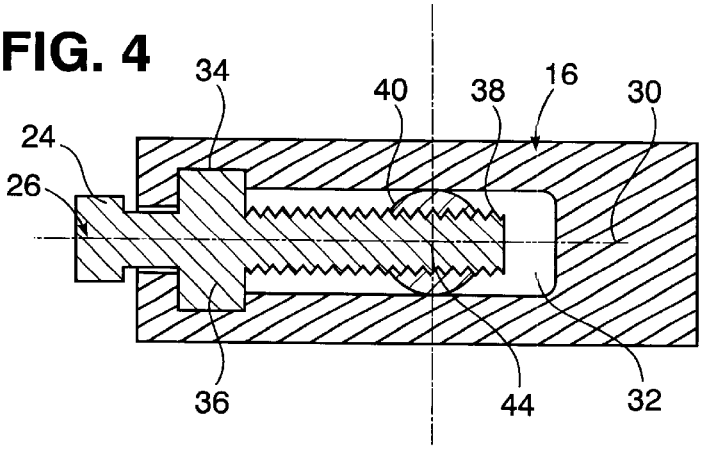
FIG. 4 is a partial section view taken substantially through a plane indicated by section line 4—4 in FIG. 3.

Referring now to FIGS. 3 and 4, the intermediate actuating wedge 16 is a tapered body having planar surfaces 28 that converge in one direction along the axis 30 of the screw bolt 26, and are in sliding contact engagement with confronting inner surfaces of the outer wedges 12 and 14. The screw bolt 26 extends into a slot formation 32 within the tapered body of the actuating wedge 16, accommodating rotation of the screw bolt about the screw axis 30 relative to the wedge 16. An annular recess portion 34 of the slot formation retains therein a radially enlarged disc portion 36 of the screw bolt axially spaced from the screw bolt head 24. The external threading 38 on the screw bolt, extending from the disc portion 36 opposite the head end 24, is threadedly received through a centering pin 40. Such centering pin 40 is rotationally fixed relative to axis 30 by slidable extension into openings 42 formed in the outer wedges 12 and 14 in alignment with an axis 44 in perpendicular intersecting relation to axis 30. Accordingly, selective rotation of the screw bolt 26 about its axis 30 will cause it to be displaced horizontally along axis 30 because of its threaded engagement with the rotationally fixed centering pin 40. Such axial movement of the screw bolt 26 is transferred by its disc portion 36 to the wedge 16, which is thereby also displaced horizontally along axis 30 relative to the centering pin 40. Such horizontal displacement of wedge 16 relative to the centering pin 40' is accommodated by the slot formation 32 in the wedge 16 as shown in FIG. 4.

Figure 5:
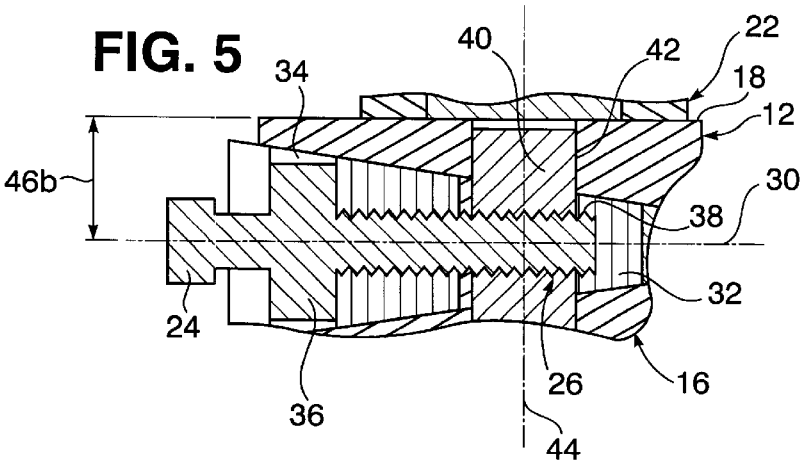
FIG. 5 is a partial side section view of the arrangement as shown in FIG. 3, in a different adjustment condition.

The foregoing referred to horizontal displacement of the actuating wedge 16 along the screw axis 30, causes it to effect vertical displacement of the outer wedge 12 along the axis 44 established in alignment with the load support 22 by the centering pin 40. FIGS. 3 and 5 show a change in vertical spacing 46*a* and 46*b* along axis 44 between the screw axis 30 and the upper surface 18 of the wedge 12, resulting from horizontal displacement of the actuating wedge 12 as hereinbefore described, reflecting the height adjustment action.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a gravitational load maintained in a leveled condition on a support, a device on which said support is mounted for in-situ vertical height adjustment of the load, comprising: a pair of outer wedges having exterior surfaces, one of which mounts the support; intermediate wedge means vertically separating the outer wedges for maintenance of said exterior surfaces in parallel spaced relation; and screw actuating means operatively connected to the intermediate wedge means for selective displacement thereof horizontally relative to the outer wedges to effect said vertical height adjustment by vertical displacement of said one of the exterior surfaces.

2. The device as defined in claim 1, wherein said screw actuating means comprises: a screw bolt having a screw axis; a centering pin through which the screw bolt threadedly extends within the intermediate wedge means; retention means for preventing displacement of the centering pin along said screw axis to induce axial displacement of the screw bolt along the screw axis in response to rotation of the screw bolt, and means for transferring said axial displacement of the screw bolt to the intermediate wedge means to effect said vertical height adjustment.

3. The device as defined in claim 1, wherein said intermediate wedge means comprises: a tapered body having a horizontally extending slot formation through which the screw actuating means extends to accommodate rotation thereof relative to the intermediate wedge means to effect said selective displacement.

* * * * *